United States Patent Office 3,427,616
Patented Feb. 11, 1969

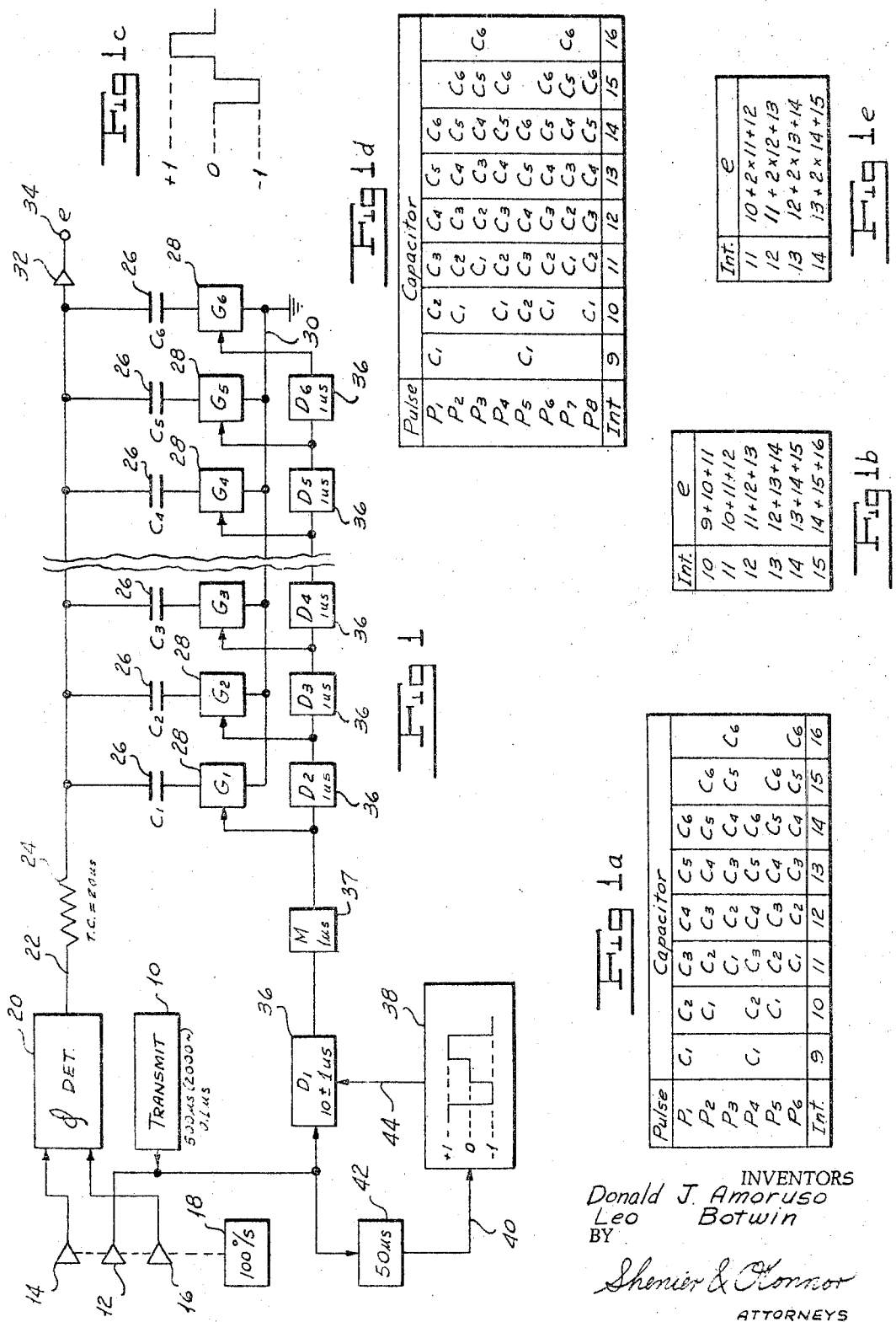

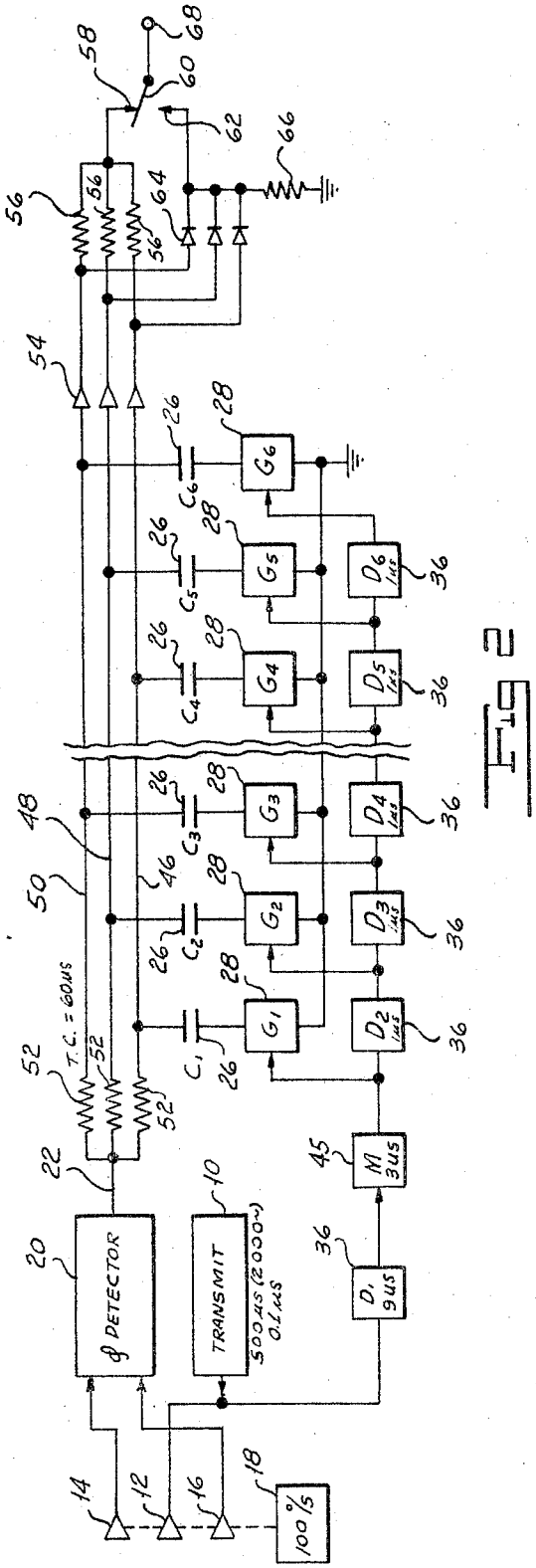

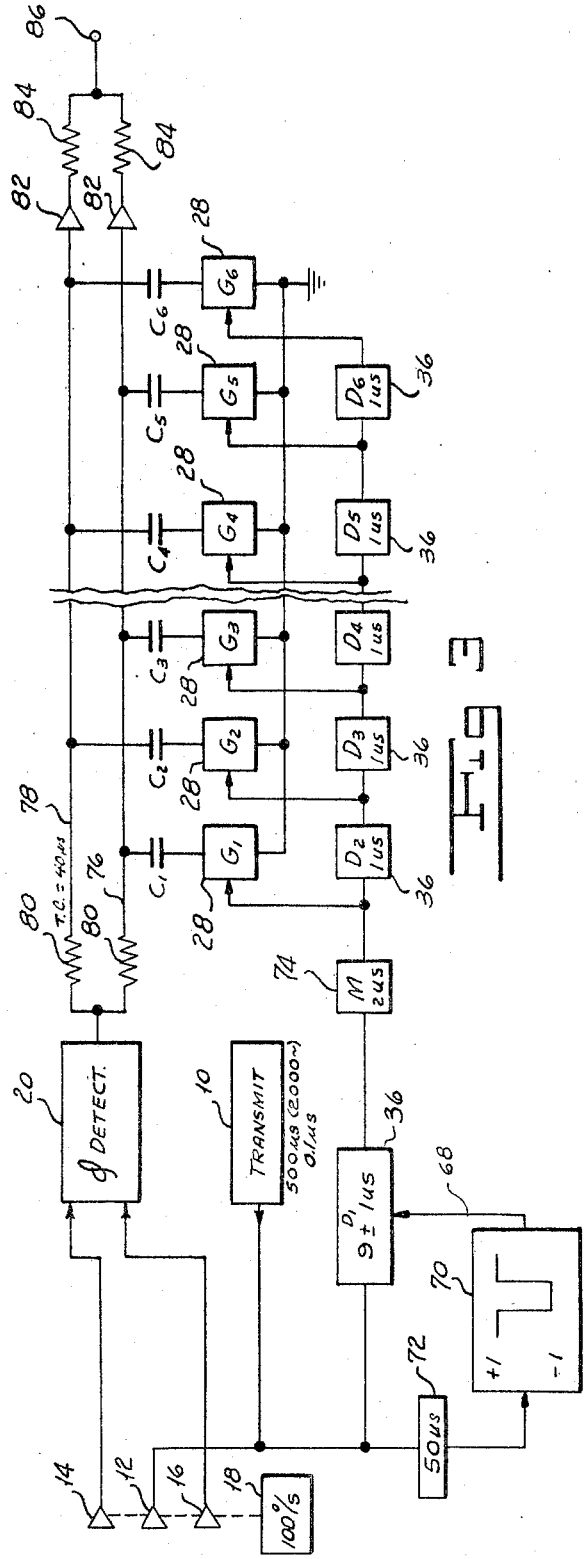

3,427,616
MONOPULSE RADAR SYSTEM OF HIGH RESOLUTION AND ACCURACY
Donald J. Amoruso, North Elmsford, and Leo Botwin, Port Chester, N.Y., assignors to United Aircraft Corporation, East Hartford, Conn., a corporation of Delaware
Filed Dec. 19, 1966, Ser. No. 602,800
U.S. Cl. 343—16          10 Claims
Int. Cl. G01s 9/02

ABSTRACT OF THE DISCLOSURE

A monopulse radar system in which received radiation corresponding to respective transmitted pulses is applied to storage devices in a predetermined time-varying relationship so that each device carries a representation of the average range over a range interval centered at the range to which the particular device corresponds.

---

Our invention relates to a monopulse radar system and more particularly to a high resolution monopulse radar system, the accuracy of which is improved by a range averaging technique.

Background of the invention

Monopulse radar systems of the type known in the prior art for use in terrain following systems, for example, provide a series of lines, each of which represents the variation in elevation angle of terrain with azimuth at a certain range. These lines are provided by values of elevation angle stored in a plurality of capacitors, each of which corresponds to one of the ranges for which lines are provided. The storage capacitors receive energy in response to an extremely narrow beam of transmitted pulses. For high resolution a large number of lines should be provided. It is of course desirable that the representations be as accurate as is possible. Furthermore, monopulse radar systems are generally required to provide an accurate elevation angle versus range at a given azimuth. Our invention enables the production of a more accurate elevation angle.

One factor which detracts from the accuracy of the system described above is random noise. This noise may be eliminated in a large measure by filtering as the signal is fed into the storage capacitors. Such filtering, however, takes time so that the information rate is reduced as the filtering action is increased and resolution is reduced.

While ideally the monopulse radar beam is extremely thin or narrow so that it has a knife edge in providing a profile of terrain along a given azimuth, as a practical matter, the beam has some width in azimuth between the half power points. Thus, if, for example, a highly reflective object exists at one side of the nominal azimuth of the beam, reflection from that object will be disproportionally large and will cause an erroneous indication of the elevation angle at the nominal azimuth. An error of this nature is repetitive.

We have invented a monopulse radar system which is more accurate than are similar systems of the prior art. Our arrangement reduces errors such as will result from extraneous reflections without sacrificing resolution. Our system may be so arranged as to improve the filtering of random noise. Our system achieves spatial averaging of received information over an interval.

One object of our invention is to provide a monopulse radar system which is more accurate than are monopulse systems of the prior art.

Another object of our invention is to provide an improved monopulse radar system which reduces errors resulting from extraneous reflections without sacrificing resolution.

A further object of our invention is to provide a monopulse radar system wherein the filtering of random noise is improved.

Yet another object of our invention is to provide a monopulse radar system incorporating a spatial averaging technique.

Other and further objects of our invention will appear from the following description.

In general our invention contemplates the provision of a monopulse radar system in which we average in range for improved accuracy without detracting from the resolution of the system by applying received radiation corresponding to respective transmitted pulses to the storage devices of the system in a predetermined time varying relationship whereby each storage device carries a representation of the average range over a range interval centered at the range to which the particular device corresponds. We may, if desired, weight the storage average at the midpoints of the interval. We may also so arrange our system as to improve filtering of random noise without affecting range averaging.

In the accompanying drawings which form part of the instant specification and which are to be read in conjunction therewith and in which like reference numerals are used to indicate like parts in the various views:

FIGURE 1 is a schematic view of one form of our improved monopulse radar system.

FIGURE 1a is a table illustrating the manner in which received radiation is stored by the storage devices of the system of FIGURE 1 during particular intervals.

FIGURE 1b is a table showing the actual information content in the output at various intervals.

FIGURE 1c is a diagram of an alternate form of time varying wave form which can be employed in the system of FIGURE 1.

FIGURE 1d is a table illustrating the storage of received radiation on the various storage devices of FIGURE 1 for different intervals where the wave form of FIGURE 1c is employed.

FIGURE 1e is a table illustrating the actual content of the output of the system of FIGURE 1 for different intervals where the wave form of FIGURE 1c is employed.

FIGURE 2 is a schematic view of an alternate embodiment of our improved monopulse radar system.

FIGURE 2a is a table illustrating the storage of received radiation in the devices of FIGURE 2 for different intervals.

FIGURE 2b is a table illustrating the content of the actual output of the system of FIGURE 2 at different intervals.

FIGURE 3 is a schematic view of a further form of our improved monopulse radar system.

FIGURE 3a is a table illustrating the storage of energy on the storage devices of FIGURE 3 at various intervals.

FIGURE 3b is a table illustrating the content of the output of the system of FIGURE 3 at various intervals.

Referring to FIGURE 1, in one form of our improved monopulse radar system, we provide a transmitter 10 for supplying pulses to a transmitting feedhorn 12 in a manner known to the art. The transmitter 10 may, for example, generate 2000 pulses per second with a pulse width of about 0.1 µs. and with an interpulse time of 500 µs. The transmitted beam is generally vertical and is extremely narrow, having a width of about 1° in azimuth. Under these conditions, the transmitter 10 sends out 20 pulses for each azimuth patch of 1°.

The receiving section of the antenna array includes vertically spaced upper and lower horns 14 and 16 adapted to receive radiation reflected from the terrain in response to the transmitted pulses. We provide the antenna array with an azimuth scanning drive 18 which oscillates the horn 12, 14 and 16 back and forth in azimuth at a rate of about 100° per second. The receiver horns 14 and 16 supply signals to the receiver phase detector 20 which, in a manner known in the art, determines the phase difference between the signals received by the upper and lower horns 14 and 16 to provide an output signal on a channel 22 as a measure of the elevation angle of the terrain from which the radiation is received.

A resistor 24 couples the signal on channel 22 to a plurality of capacitors 26 identified, respectively, as C1, C2 ... Cn where n is the number of elevation angle lines to be provided. Each of the capacitors 26 has the same value and, together with the resistor 24, provides a filter having a time constant of, for example, 20 $\mu$s. We connect each of the capacitors 26 in series with a respective gate 28 between the resistor 24 and a ground line 30, thus to provide a plurality of parallel circuits. An isolating amplifier 32, such as an emitter follower or the like, connects the capacitor output terminals to output terminal 34 of the system. While we have shown only six capacitors 26, it will readily be appreciated by those skilled in the art that a much larger number are provided in actual practice, as many as 500 such capacitors being employed.

We apply the elevation angle signal on channel 22 to the respective capacitors 26 with a predetermined time relationship betwen the reflected radiation resulting from respective transmitted pulses by means of delay networks 36 associated with the respective gating circuits 28. The transmitter 10 not only applies its output pulse to the transmitting horn 12 but also to the delay network 36 associated with the first gate 28. For purposes of elucidation, we have identified the respective gates associated with capacitors C1, C2, C3 ... C6, as G1, G2, G3 ... G6 and have similarly identified the delay networks by the legends D1, D2, D3 ... D6. We so arrange the network D1 as to provide a certain delay depending upon an input signal applied to the network from a wave form generator 38 which may, for example, be a staircase generator adapted to be stepped in response to an input signal on a channel 40. A multivibrator 37, nominally labeled as having a pulse duration of 1 $\mu$s., has a pulse duration of almost but slightly less than 1 $\mu$s. to ensure that the gates are conductive for almost that period of time in response to the signals from network 36. Another delay network 42 applies the transmitted pulse to channel 40 after a predetermined time delay. With no input signal on the control channel 44, network 36 provides a delay of, for example, 10 $\mu$s. corresponding to the minimum range. Thus, 10 $\mu$s. after a transmitted pulse, delay network D1 enables gate G1 to connect capacitor C1 to the ground line 30. When this occurs, C1 can store the received signal corresponding to that time period. The respective delay networks D2, D3, D4 ... successively enable the respective gates G2, G3, G4 ... after respective delays of, for example, 1 $\mu$s. each. Thus, considering the interval which occurs 10 $\mu$s. after the transmitted pulse, the received energy at that time is applied to capacitor C1 and 1$\mu$s. later it is applied to capacitor C2 and 2 $\mu$s. later it is applied to capacitor C3 and so forth.

We so select the delay provided by network 42 as to be relatively long as compared with the time constant of the filter formed by resistor 24 and a capacitor 26. For example, it may be 50 $\mu$s. Upon the occurrence of a second transmitted pulse, the generator 38 is stepped to apply a signal to channel 44 which changes the delay of network D1 by 1 $\mu$s. If, for example, the circuit had initially been set to provide a 10 $\mu$s. delay with no signal on channel 44, then the second pulse provides such a signal on channel 44 as will cause the delay of network D1 to be 11 $\mu$s. In that event, gate G1 will not be enabled until 11 $\mu$s. after transmission of the second pulse and received radiation consequently will not be applied to capacitor C1 until 11 $\mu$s. after the second pulse.

To review the operation of our monopulse radar system thus far described, let us consider the operation of the system for a sequence of pulses identified as P1, P2, P3 ... Assume further that the staircase wave form generator 38 puts out such a signal on channel 44 that the delay network D1 provides a delay of 9 $\mu$s. Under these conditions, the first pulse P1 is transmitted and 9 $\mu$s. later it is applied by network D1 to gate G1 to connect capacitor C1 between resistor 24 and the ground line 30. Reflected energy from pulse P1 is applied to capacitor C1. 1 $\mu$s. later, the energy is applied to capacitor C2 and so forth down the line of capacitors.

Then 500 $\mu$s. later pulse P2 is transmitted. In the interim and after all capacitors have received reflected energy from pulse P1, delay network 42 actuates the wave generator 38 to a condition at which the network 38 produces no output signal and delay network 36 provides a 10 $\mu$s. delay. Thus, 10 $\mu$s. after transmission of pulse P2, gate G1 is energized to permit capacitor C1 to receive energy reflected by pulse P2. After successive delays of 1 $\mu$s. each, the remaining capacitors are permitted to receive energy reflected as a result of pulse P2.

Before the next pulse P3 is transmitted, the delay network 42 actuates generator 38 to a condition at which it puts out such a signal that network D1 provides a delay of 11 $\mu$s. Thus, 11 $\mu$s after transmission of pulse P3, reflected energy therefrom can be received by capacitor C1. Again, after successive 1 $\mu$s. delays, the remaining capacitors are permitted to receive energy reflected as a result of the transmission of pulse P3. At this point, the network 42 actuates generator 38 to return network D1 to the condition wherein it provides a delay of only 9 $\mu$s. Thus, 9 $\mu$s. after transmission of pulse P4, that energy is translated to capacitor C1 and thence down the line to the remaining capacitors after respective delays of 1 $\mu$s. This operation continues for successive pulses. We have indicated in the table shown in FIGURE 1a the capacitors which receive energy of the various pulses at different intervals corresponding to a number of range lines to be formed on the display, for example.

It will readily be appreciated that each capacitor after a period of time of operation carries a voltage which represents the average elevation angle over a range interval which is centered about the range to which the particular capacitor corresponds. Thus, as is indicated in FIGURE 1b, the output signal at any interval actually is an average of the elevation angle over a range interval centered about the particular interval.

By employing a somewhat different wave form at the generator 38, we may cause the output for a given interval to be an average which includes a weighted value at the time corresponding to the particular interval. As shown in FIGURE 1c, such a wave form goes from a signal providing 0 $\mu$s. delay differential to a signal providing −1 $\mu$s. delay differential and remains at that level until generator 38 is actuated, at which time it returns to a 0 $\mu$s. delay differential level until again actuated, at which time it rises to a level providing +1 $\mu$s. delay differential. Considering the use of this wave form in connection with the delay network D1 and assuming that it puts out a −1 $\mu$s. delay differential signal, network D1 first provides a delay of 9 $\mu$s. so that 9 $\mu$s. after transmission of pulse P1, for example, gates G1 to G6 are enabled at 1 $\mu$s. intervals following the 9th interval. Before the next pulse P2, network 38 is actuated to provide zero change in the delay so that network D1 provides 10 $\mu$s. delay for the next interval. Then after 10 $\mu$s. from transmission of pulse P2, gates G1 to G6 are sequentially enabled. Before the occurrence of the next pulse, the generator 38 is actuated to provide +1 $\mu$s. delay difference so that network D1 provides 11 $\mu$s. delay and gates G1 to G6 are successively energized 11 $\mu$s. after transmission of the pulse.

The operation of the system thus far is the same as that described in connection with FIGURES 1a and 1b. However, before transmission of the next pulse, the generator 38 is actuated to return it to the condition at which it provides no delay difference rather than to the condition wherein it provides −1 μs. delay difference as is the case where the wave form shown in FIGURE 1 is used. Owing to this operation, reflected energy from pulse P4 is applied to the capacitors in the same manner as it was during the course of pulse P2. This operation can readily be followed through for the next sequence of pulses P5 through P8 as shown in the table of FIGURE 2. In this instance the output signal $e$ corresponding to an interval will be the average of the elevation angle value at a range just before and at a range just after the interval under consideration together with twice the value for the particular interval being considered. By way of example in the table of FIGURE 1e, we have indicated the output at various intervals illustrating the manner in which the signal is weighted at the mid-range point. As will be apparent from the description hereinafter, weighting the signal in the mid-region thereof may be useful where a relatively long range interval is under consideration.

Referring now to FIGURE 2, we have shown an alternate form of our monopulse radar system in which we are able to provide an increased filter time constant without affecting the range averaging and without appreciably shifting the presentation in time. Owing to the provision of a longer time constant, filtering of random noise is improved. Like parts to those shown in FIGURE 1 have been indicated by the same reference characters in FIGURE 2 as those which we employed in FIGURE 1. However, rather than employing a delay network D1, the time delay of which is varied in response to the output of a wave form generator, such as the generator 38, we provide a delay network D1 providing a time delay of, for example, 9 μs. corresponding to the minimum range. We apply the output of the delay network D1 to a monostable multivibrator 45 which in response to an input pulse provides an output pulse having a width or duration of 3 μs. for example. The output of the multivibrator 45 is applied to the gating circuits G1 to G6 in a manner similar to that in which the output of delay network D1 in the form of our invention shown in FIGURE 1 is applied. It will readily be appreciated, however, that upon the application of the multivibrator output to a gate, that gate is enabled for a period of 3 μs.

We provide the form of our system shown in FIGURE 2 with three output channels 46, 48 and 50. Each of the output channels comprises a resistor 52 which, together with one of the capacitors 26, forms a filter having a relatively long time constant as compared with the resistor 24 and capacitor 26 of FIGURE 1. By way of example, a time constant of 60 μs. may be provided. While multivibrator 45 is labeled as having a nominal pulse duration of 3 μs., actually the duration is slightly less to avoid concomitant conduction through gates of two groups such as gates G3 and G4 for example.

Respective isolating output amplifiers 54 and series connected resistors 56 connect channels 46, 48 and 50 to one terminal 58 of a two-position switch having a contact arm 60 adapted to move between a position at which it engages terminal 58 and a position at which it engages another terminal 62. Respective detectors 64 connect the amplifiers 52 to the common terminal of contact 62 and a grounded resistor 66. It will be appreciated that resistors 56 comprise an analogue adding circuit while detectors 64 comprise an OR circuit. As will be explained more fully hereinafter, with arm 60 in engagement with contact 58, the average of the capacitor values is applied to an output terminal 68. Alternatively, when arm 60 engages contact 62, the peak capacitor value is detected.

Let us consider the operation of the arrangement of FIGURE 2 in connection with successively transmitted pulses 9 μs. After transmission of the pulse P1 and 3 μs. output pulse of network 45 is applied to gate G1 to enable the gate for 3 μs. to permit capacitor C1 to store received energy over the intervals 9, 10 and 11. 1 μs. after the enabling of gate G1, delay network D2 applies the 3 μs. pulse to gate G2 to enable that gate for 3 μs. to permit capacitor C2 to receive energy for the 10th, 11th the 12th intervals. 1 μs. later, the enabling pulse is applied to gate G3 to enable capacitor C3 for the 11th, 12th and 13th intervals. Subsequently, the enabling pulse moves down the line of storage capacitors at 1 μs. intervals.

As has been explained hereinabove in the form of our system shown in FIGURE 2, we provide three output channels 46, 48 and 50. We so connect the capacitors to the channels as to avoid any shorting of two capacitors in response to the enabling pulse. Specifically we connect capacitors C1 and C4 to channel 46, capacitors C2 and C5 to channel 48 and capacitors C3 and C6 to channel 50. It will be noted that the number of output channels is so related to the length of the enabling pulse that by the time, for example, that the enabling pulse is applied to gate G4 to permit capacitor C4 to receive energy, gate G1 is disabled and capacitor C1 is no longer in the circuit.

The table in FIGURE 2a illustrates the intervals during which the various capacitors are permitted to receive energy as a result of reflections produced by two successive transmitted pulses P1 and P2. From the table it will readily be apparent that C1 is permitted to receive energy during the 9th, 10th and 11th intervals; C2 is permitted to receive energy during the 10th, 11th and 12th intervals; while C3 is permitted to receive energy during the 11th, 12th and 13th intervals. It will thus be apparent that an output signal during the 11th interval may be obtained which is an average of the 9th interval plus twice the 10th interval, plus three times the 11th interval, plus twice the 12th interval, plus the 13th interval. In this way the average is weighted at the midpoint in the range interval and somewhat less weighted at two ranges on either side of the center range interval. It is possible also of course to detect the peak by connecting switch arm 60 to contact 62. The salient feature of this form of our arrangement is the long time constant provided for the filters to reduce random noise while not affecting the rate at which information is received owing to the parallel output channel arrangement.

Referring now to FIGURE 3, we have shown a still further form of our monopulse radar system which is a combination of the forms shown in FIGURES 1 and 2. Like parts are indicated by the same reference characters as are employed in FIGURES 1 and 2. In this arrangement we apply the transmitted pulses from the transmitter 10 to a delay network D1 similar to that shown in FIGURE 1, which is adapted to be actuated to provide a delay of 9±1 μs. in response to a control signal provided on an output channel 68 of a wave generator 70. The generator 70 is arranged to provide an output signal which at one level adds 1 μs. delay to network D1 and at another level to subtract 1 μs. from the delay provided by network D1. A delay network 72 similar to the network 42 of FIGURE 1 applies the transmitted pulse to the network 70 to change its state between two successive pulses.

We apply the output of the delay network D1 to a one-shot multivibrator 74 which provides an output pulse of slightly less than 2 μs. duration. The output of multivibrator 74 is applied to the gating circuits G1 to G6 in a manner similar to that outlined hereinabove in connection with FIGURES 1 and 2. As was explained hereinabove in connection with FIGURE 2, where we employ a multivibrator affording a pulse having a length which is longer than the delay afforded by networks D2, D3, etc., we must employ a plurality of output channels, the number of which equals that multiple of the delay of network D2, for example, which equals the multivibrator pulse length. Thus, in the arrangement of FIGURE 3, where the pulse length is 2 μs., we employ two output channels 76 and 78 and connect alternate capacitors, respectively, to the two output channels. The resistors 80 of the channels 76 and 78 may be selected to provide a filter time constant greater than that which is possible in the arrangement of FIGURE 1 and which may, for example, be 40 μs. Isolating output amplifiers 82 couple the signals on channels 76 and 78 to respective resistors 84 connected to the output terminal 86.

Considering the arrangement of FIGURE 3, in connection with a plurality of successively transmitted pulses and assuming that the generator 70 is in a condition at which its output signal on channel 68 reduces the delay of network D1 by 1 μs., then 8 μs. after a transmitted pulse the multivibrator 74 applies a 2 μs. length enabling pulse to gate G1 to permit C1 to receive energy for the 8th and 9th intervals. After 1 μs. delay, the multivibrator enabling pulse is applied to gate G2 to permit C2 to receive reflected radiation for the 9th and 10th intervals. This operation continues down the line of capacitors until all the radiation reflected as a result of pulse P1 has been stored. After that occurrence and before the next transmitted pulse, generator 70 is actuated to the condition at which it adds 1 μs. delay to that provided by network D1 or an overall delay of 10 μs. Thus, 10 μs. after transmission of pulse P2 multivibrator 74 produces an output pulse which enables gate G1 for 2 μs. to permit C1 to receive energy during the 10th and 11th intervals. The operation then continues as before. We have shown the enabled capacitors for various intervals on the occurrence of transmitted pulses in FIGURE 3a.

In operation of our monopulse radar system we may, for example, apply a signal *e* to the vertical deflection terminal of the display and apply the azimuth sweep signal corresponding to the sweep provided by the system 18 to the horizontal deflection terminal of the display. In response to the application of these signals, the observer of the display is presented with a picture of the terrain as it might be seen on a moonlit night. That is to say, sharp changes in elevation angle show up as relatively dark regions while ridges and regions wherein the elevation angle changes relatively slowly are highlighted.

Specifically considering the form of our invention shown in FIGURE 1, the pattern of radiation of the antenna 12 is very narrow in azimuth. A pulse transmitted is reflected back from the terrain and the upper and lower receivers 14 and 16 pick up the reflected radiation and feed the phase detector 20. Detector 20 produces an output signal indicating the elevation angle of the terrain from which the signal is reflected. Assuming that the network 38 is so set as to provide a −1 μs. delay difference for the network 36, the latter will produce a delay of 9 μs. Thus, 9 μs. after a transmitted pulse gate G1 is enabled to permit the output signal on the channel 22 to be applied to capacitor C1. Following that operation, at successive intervals of 1 μs. each, the signal on channel 22 is applied to capacitors C2, C3, C4 and so forth. 50 μs. after transmission of a pulse, network 42 applies a signal to channel 40 to change the delay afforded by delay difference network 38 from −1 μs. to no delay difference so that network 36 provides a 10 μs. delay. Thus, 10 μs. after transmission of the next pulse, the output signal on channel 22 is applied to capacitor C1 and after successive delays of 1 μs. each, the channel is coupled to capacitors C2, C3, C4 and so on. 50 μs. after transmission of the second pulse, network 38 is operated to provide a delay difference of +1 μs. so that network 36 has an overall delay of 11 μs. Thus, the signal on channel 22 resulting from the third transmitted pulse is applied to capacitor C1 11 μs. following this transmission and thence to the other capacitors successively after respective delays of 1 μs. each. 50 μs. later, network 38 is set back to its −1 μs. delay and operation continues as described.

FIGURE 1a shows the time intervals during which the signal on channel 22 is applied to the various capacitors while FIGURE 1b indicates that received radiation corresponding to various intervals which makes up the output signal *e* for particular intervals. That is, the output signal which nominally corresponds to the interval 10, for example, is made up of energy from the 9th, 10th and 11th intervals. Thus, the output signal received is an average of values of elevation angle centered about the value at a particular interval.

By changing the wave form of the delay difference network 38 to that shown in FIGURE 1c, the output average can be weighted at the midpoint of the averaging interval. The operation of the system with the form of wave form in FIGURE 1c can be readily followed through in the manner described above with reference to FIGURES 1d and 1e.

Referring to FIGURE 2 we have shown an alternate form of our system wherein the time constant of the filter made up by one of the resistors 52 and a capacitor C1 can be increased without affecting range averaging and without appreciably shifting the presentation in time. For example, where a time constant of 20 μs. is provided in the arrangement of FIGURE 1, the time constant may be increased as shown in FIGURE 2 to 60 μs. by employing three output channels. In that arrangement, 9 μs. after transmission of a pulse, a multivibrator 45 having a period of 3 μs. is enabled to enable gate G1 for 3 μs. Thereafter, at 1 μs. intervals the multivibrator pulse is applied to the subsequent gates. So that there will be no shorting out of the capacitors, successive capacitors in groups of three are connected to the three respective output lines. The results of the operation of the system of FIGURE 2 can readily be seen by reference to FIGURES 2a and 2b. The time averaging is over a greater range of intervals and is weighted both at the midpoint of the range and at points on either side thereof. That form of our system also incorporates a switch arm 60 which can be engaged with a contact 58 to provide an average output value or it can be engaged with a contact 62 to detect the peak.

FIGURE 3 illustrates an arrangement which is a combination of the two systems shown in FIGURES 1 to 2. This arrangement provides a time constant of 40 μs. and requires two output channels 76 and 78. The operation of the arrangement is analogous to that of FIGURES 1 to 2 and the operation thereof can readily be followed through by reference to FIGURES 3a and 3b. From these two figures, it will be seen that the output signal is weighted equally at points within the range other than the two extreme intervals.

While we have shown and described our invention as including a digital variable time delay which is actuated by transmitted pulses, it is to be understood that any waveform can be employed. For example we might employ a sinusoidal or other waveform generated by an oscillator independent of the transmitted pulses to vary the time delay.

It will be seen that we have accomplished the objects of our invention. We have provided a monopulse radar system which is more accurate than are systems of this type known in the art. Our system reduces errors such as will result from extraneous reflections without at the same time sacrificing resolution. It achieves spatial averaging of received information over an interval. It can be so arranged as to improve filtering of random noise.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A monopulse radar system including in combination means for transmitting pulses of energy, means responsive to reflected energy for producing a signal as a function of the elevation angle of the reflected energy, a number of capacitors, means comprising an equal number of resistors for coupling the signal to the capacitors, an equal number of gates each associated with a corresponding capacitor, a variable time delay device responsive to transmitted pulses, means responsive to the device for sequentially actuating the gates, means for cyclically varying the time delay provided by the device, and means responsive to the capacitors for providing an output.

2. A monopulse radar system including in combination means for transmitting pulses of energy, means responsive to reflected energy for producing a signal as a function of the elevation angle of the reflected energy, a number N of capacitors, means comprising an equal number of resistors for coupling the signal to the capacitors, an equal number of gates each associated with a corresponding capacitor, means responsive to transmitted pulses for sequentially actuating the gates at equal intervals V of time, each of said gates being actuated for a period of time which is not greater than NV, and means responsive to the capacitors for providing an output.

3. A system as in claim 2 in which the output means comprises an analog adding circuit.

4. A system as in claim 2 in which the output means comprises an OR circuit.

5. A system as in claim 2 in which each gate is actuated for a period which is slightly less than NV.

6. A system as in claim 2 in which the actuating means comprises a monostable flip-flop providing a pulse having a duration of approximately NV.

7. A monopulse radar system including in combination means for transmitting pulses of energy, means responsive to reflected energy for producing a signal as a function of the elevation angle of the reflected energy, a plurality of capacitors, means comprising a resistor for coupling the signal to each of the capacitors, a plurality of gates each associated with corresponding capacitor, and means responsive to transmitted pulses for sequentially actuating the gates at equal intervals of time, each of said gates being actuated for a period of time which is not greater than said interval, the actuating means comprising a variable time delay device and means for cyclically varying the time delay provided by said device.

8. A system as in claim 7 in which each gate is actuated for a period which is slightly less than said interval.

9. A system as in claim 7 in which the actuating means further comprises a monostable flip-flop providing a pulse having a duration approximately equal to said interval.

10. A system as in claim 7 in which the cyclic varying means digitally varies the time-delay of the device in discrete steps.

No references cited.

RODNEY D. BENNETT, *Primary Examiner.*

JEFFREY P. MORRIS, *Assistant Examiner.*